J. CAPEN.
Hay Loader.
No. 98,027. Patented Dec. 21, 1869.
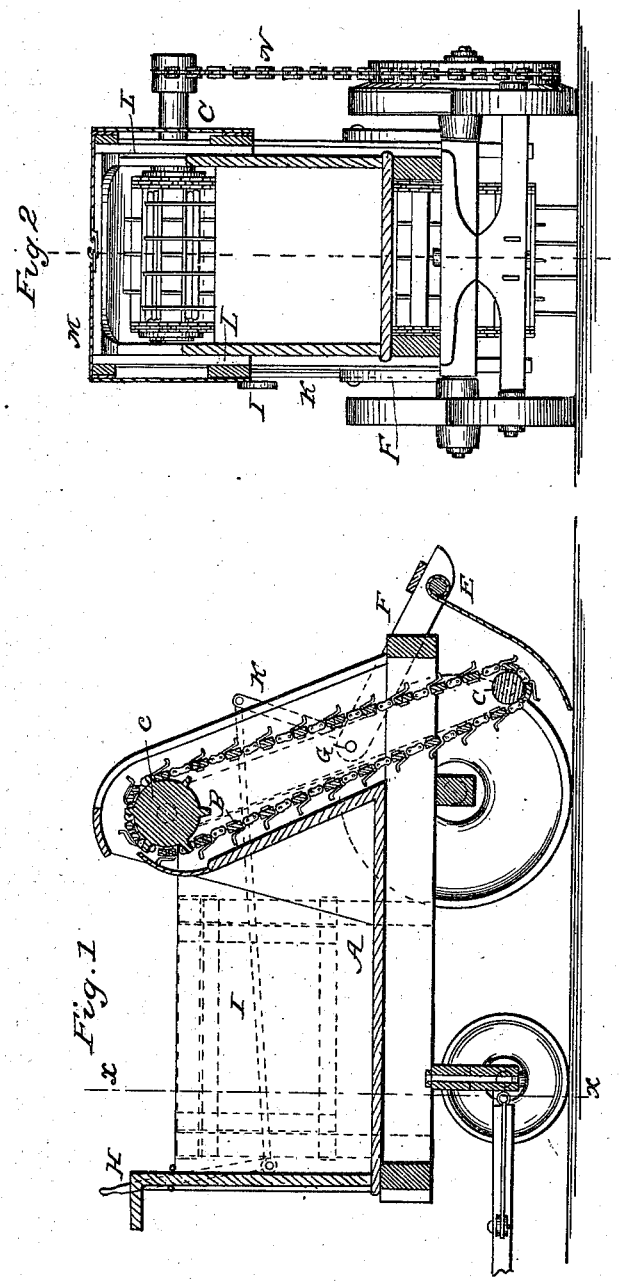

United States Patent Office.

JAMES CAPEN, OF CHARLTON, MASSACHUSETTS.

Letters Patent No. 98,027, dated December 21, 1869.

IMPROVEMENT IN HAY-LOADER.

The Schedule referred to in these Letters Patent and making part of the same.

To all whom it may concern:

Be it known that I, JAMES CAPEN, of Charlton, in the county of Worcester, and State of Massachusetts, have invented a new and improved Self-Loading Hay-Wagon; and I do hereby declare that the following is a full, clear, and exact description thereof, which will enable others skilled in the art to make and use the same, reference being had to the accompanying drawing, forming part of this specification.

This invention relates to improvements in hay-loaders; and consists in the combination and arrangement of parts, as hereinafter specified.

Figure 1 represents a longitudinal section of my improved hay-loading wagon, and Figure 2 represents a transverse section, on the line $x\, x$ of fig. 1.

Similar letters of reference indicate corresponding parts.

I propose, instead of employing a hay-loading device on a separate truck, to be attached to and drawn along by the wagon, to attach the raking and loading-device directly to the box or frame of the hay-wagon, as represented in the drawings, A being the box or rack of the hay-wagon; B, the endless elevator; C, the rollers for the elevator; and D, the case. The latter is arranged obliquely on the rear end of the wagon-frame, and the rollers suitably arranged, one above and one below.

E is a rake of spring-teeth, suspended in rear of the lower end of the elevator, on arms F, jointed, at G, to the sides of the frame, and connected to a hand-lever, H, near the front, by a rod, I, and arms K, so that the driver, while attending to his team, may change the position of the rake, as required.

I have also provided, at the sides of the wagon-box, vertically-sliding frames L, with sheets M, of canvas, stretched upon them, and arranged for connecting the sheets of each side over the top of the frame, to protect the hay against blowing away when the wind blows.

The upper roller of the elevator is worked by a machine-chain or belt, N, working over a drum on one of the hind wheels of the wagon, or two belts may be used, one from each wheel.

This arrangement is very simple and much cheaper in first cost, and requires much less power to operate it than any arrangement of separate trucks in the common way.

Having thus described my invention,

I claim as new, and desire to secure by Letters Patent—

The combination of the rake E, case D, and elevator B, with the vertically-sliding frames L and sheets M, all constructed and arranged together, as described, to collect, load, and protect the hay from winds, and in the manner described.

JAMES CAPEN.

Witnesses:
   E. S. SOUTHWICK,
   A. E. LAMB.